(12) United States Patent
Woodman

(10) Patent No.: US 9,699,360 B2
(45) Date of Patent: Jul. 4, 2017

(54) CAMERA HOUSING WITH INTEGRATED EXPANSION MODULE

(71) Applicant: GoPro, Inc., San Mateo, CA (US)

(72) Inventor: Nicholas D. Woodman, Woodside, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/187,708

(22) Filed: Jun. 20, 2016

(65) Prior Publication Data

US 2016/0309064 A1    Oct. 20, 2016

Related U.S. Application Data

(60) Continuation of application No. 14/132,554, filed on Dec. 18, 2013, now abandoned, which is a continuation of application No. 13/665,594, filed on Oct. 31, 2012, now Pat. No. 8,638,392, which is a continuation of application No. 13/469,926, filed on
(Continued)

(51) Int. Cl.
| | |
|---|---|
| *H04N 5/225* | (2006.01) |
| *G03B 17/56* | (2006.01) |
| *G03B 17/08* | (2006.01) |
| *H04N 5/232* | (2006.01) |
| *G03B 17/02* | (2006.01) |

(52) U.S. Cl.
CPC .......... *H04N 5/2252* (2013.01); *G03B 17/02* (2013.01); *G03B 17/08* (2013.01); *G03B 17/568* (2013.01); *H04N 5/2251* (2013.01); *H04N 5/232* (2013.01); *H04N 5/23209* (2013.01); *H04N 5/23293* (2013.01); *G03B 2206/00* (2013.01)

(58) Field of Classification Search
CPC ................................ G03B 17/08; G02B 23/22
USPC ......................................... 348/81; 396/25–29
See application file for complete search history.

(56) References Cited

U.S. PATENT DOCUMENTS

| | | | | |
|---|---|---|---|---|
| 3,860,937 | A | * | 1/1975 | Wolfe .................... G03B 17/08 396/27 |
| 4,025,930 | A | * | 5/1977 | Wolff .................... G03B 17/08 352/174 |

(Continued)

FOREIGN PATENT DOCUMENTS

| | | |
|---|---|---|
| EP | 1653423 A1 | 5/2006 |
| GB | 2363028 A | 12/2001 |

(Continued)

OTHER PUBLICATIONS

Canon, "Wireless file Transmitter WFT-EF E," 2009, 132 pages, [Online] [Retrieved on Feb. 11, 2015] Retrieved from the Internet<URL:http://shuttersnitch.com/downloads/manuals/canon/wft-e5-en.pdf.

(Continued)

*Primary Examiner* — Shahbaz Nazrul
(74) *Attorney, Agent, or Firm* — Fenwick & West LLP

(57) ABSTRACT

A camera housing includes an integrated expansion module for providing expanded functionality to a camera (e.g., a display screen). Different embodiments of the housing include different expansion modules for adding a variety of features to the camera when the camera is placed in the housing. Thus, a user may modify features of a camera by swapping the housing. Furthermore, a user may add a feature to an existing camera without needing to purchase a new camera.

17 Claims, 16 Drawing Sheets

Related U.S. Application Data

May 11, 2012, now Pat. No. 8,325,270, which is a division of application No. 12/498,890, filed on Jul. 7, 2009, now Pat. No. 8,199,251.

(60) Provisional application No. 61/078,756, filed on Jul. 7, 2008.

(56) References Cited

U.S. PATENT DOCUMENTS

| | | | |
|---|---|---|---|
| 4,888,795 A | | 12/1989 | Ando et al. |
| 5,294,988 A | * | 3/1994 | Wakabayashi ....... H04N 5/2251 348/373 |
| 5,327,265 A | | 7/1994 | McDonald |
| 5,563,661 A | | 10/1996 | Takahashi et al. |
| 5,627,587 A | | 5/1997 | Murata et al. |
| 5,657,081 A | | 8/1997 | Kurahashi |
| 5,661,823 A | | 8/1997 | Yamauchi et al. |
| 5,805,219 A | | 9/1998 | Ejima et al. |
| 5,926,218 A | | 7/1999 | Smith |
| 5,946,501 A | * | 8/1999 | Hayakawa ............. G03B 17/08 396/25 |
| 5,969,750 A | | 10/1999 | Hsieh et al. |
| 6,035,147 A | | 3/2000 | Kurosawa |
| 6,118,929 A | | 9/2000 | Kawamura et al. |
| 6,128,441 A | * | 10/2000 | Kamata ................. G03B 17/08 348/81 |
| 6,138,826 A | * | 10/2000 | Kanamori ............. A45C 11/38 206/316.2 |
| 6,332,146 B1 | | 12/2001 | Jebens et al. |
| 6,480,671 B2 | | 11/2002 | Takahashi et al. |
| 6,583,809 B1 | | 6/2003 | Fujiwara |
| 6,809,759 B1 | | 10/2004 | Chiang |
| 6,955,484 B2 | | 10/2005 | Woodman |
| 7,129,981 B2 | | 10/2006 | Berstis |
| 7,196,722 B2 | | 3/2007 | White et al. |
| 7,337,403 B2 | | 2/2008 | Pavley et al. |
| 7,362,352 B2 | | 4/2008 | Ueyama |
| 7,379,664 B2 | | 5/2008 | Marcus |
| 7,463,304 B2 | | 12/2008 | Murray |
| 7,464,215 B2 | | 12/2008 | Kawai |
| 7,496,293 B2 | | 2/2009 | Shamir et al. |
| 7,508,420 B2 | | 3/2009 | Kitajima |
| 7,543,327 B1 | | 6/2009 | Kaplinsky |
| 7,612,821 B1 | | 11/2009 | Hsia |
| 7,643,056 B2 | | 1/2010 | Silsby |
| 7,656,294 B2 | | 2/2010 | Boss et al. |
| 7,663,666 B2 | | 2/2010 | Kawai et al. |
| 7,671,886 B2 | | 3/2010 | Sawada |
| 8,013,932 B2 | * | 9/2011 | Chan ................... H04N 5/2252 348/373 |
| 8,026,945 B2 | | 9/2011 | Garoutte et al. |
| 8,031,222 B2 | | 10/2011 | Crinon et al. |
| 8,194,145 B2 | | 6/2012 | Lee et al. |
| 8,194,174 B2 | | 6/2012 | Roskowski |
| 8,218,025 B2 | | 7/2012 | Yonaha |
| 8,300,107 B2 | | 10/2012 | Strandwitz et al. |
| 8,830,326 B2 | | 9/2014 | Kitagawa |
| 8,917,496 B2 | * | 12/2014 | Richardson ........... G06F 1/1626 361/679.01 |
| 2001/0043281 A1 | * | 11/2001 | Onuki ................. H04N 1/00204 348/375 |
| 2002/0101534 A1 | | 8/2002 | Liu |
| 2002/0178116 A1 | | 11/2002 | Yamasaki |
| 2003/0104806 A1 | | 6/2003 | Ruef et al. |
| 2003/0179306 A1 | | 9/2003 | Lee |
| 2004/0066457 A1 | | 4/2004 | Silverstein et al. |
| 2004/0076415 A1 | * | 4/2004 | Da Silva ............. G03B 17/08 396/25 |
| 2004/0201745 A1 | | 10/2004 | Wess et al. |
| 2004/0212687 A1 | | 10/2004 | Patwari |
| 2005/0190263 A1 | | 9/2005 | Monroe et al. |
| 2006/0015664 A1 | | 1/2006 | Zhang |
| 2006/0066753 A1 | | 3/2006 | Gennetten et al. |
| 2006/0098966 A1 | * | 5/2006 | Takahashi ............. G03B 17/08 396/29 |
| 2006/0262365 A1 | | 11/2006 | Imao |
| 2006/0274157 A1 | | 12/2006 | Levien et al. |
| 2007/0025711 A1 | | 2/2007 | Marcus |
| 2007/0071423 A1 | | 3/2007 | Fantone et al. |
| 2007/0077062 A1 | | 4/2007 | Senba et al. |
| 2007/0109417 A1 | | 5/2007 | Hyttfors et al. |
| 2007/0126883 A1 | | 6/2007 | Ishige et al. |
| 2007/0244634 A1 | | 10/2007 | Koch et al. |
| 2007/0268382 A1 | | 11/2007 | Shiomi |
| 2008/0074487 A1 | | 3/2008 | Ryckman |
| 2008/0100712 A1 | | 5/2008 | Hayes et al. |
| 2008/0122958 A1 | | 5/2008 | Huseth et al. |
| 2008/0180537 A1 | | 7/2008 | Weinberg et al. |
| 2008/0316327 A1 | | 12/2008 | Steinberg et al. |
| 2009/0109286 A1 | | 4/2009 | Ennis |
| 2010/0060747 A1 | | 3/2010 | Woodman |
| 2010/0079607 A1 | | 4/2010 | Won et al. |
| 2010/0118158 A1 | | 5/2010 | Boland et al. |
| 2010/0141762 A1 | | 6/2010 | Siann et al. |
| 2010/0205537 A1 | | 8/2010 | Knighton et al. |
| 2010/0220188 A1 | | 9/2010 | Renkis |
| 2010/0246669 A1 | | 9/2010 | Harel |
| 2010/0283843 A1 | | 11/2010 | Cai |
| 2010/0289904 A1 | | 11/2010 | Zhang et al. |
| 2010/0333155 A1 | | 12/2010 | Royall et al. |
| 2011/0298970 A1 | | 12/2011 | Shinohara et al. |

FOREIGN PATENT DOCUMENTS

| | | |
|---|---|---|
| JP | 2004/080256 A | 3/2004 |
| WO | WO 2004/023795 A1 | 3/2004 |
| WO | WO 2004/081713 A2 | 9/2004 |
| WO | WO 2005/096760 A2 | 10/2005 |
| WO | WO 2007/128317 A1 | 11/2007 |
| WO | WO 2007/130146 A1 | 11/2007 |

OTHER PUBLICATIONS

CheesyCam.com, "Remote LCD Live View + Remote Shutter for DSLR Video—Exciting!", Jul. 16, 2010, 12 pages, [Online] [Retrieved on Feb. 11, 2015] Retrieved from the Internet<URL:http://cheesycam.com/remote-lcd-live-view-for-dslr-video-exciting/>.

"GoPro Hero 3 Sports Wrist Camera Review," PaddleDogNation, 2006, [Online] [Retrieved on Aug. 8, 2007] Retrieved from the Internet<URL:http://paddledognation.com/Reviews/PaddlingGear-Reviews/Hero3Ca . . . >.

Guarnera, M. et al., "Manet: Possible Applications with PDA in Wireless Imagining Environment", IEEE International Symposium, Sep. 2002, vol. 7, pp. 2394-2398, vol. 5, pp. 15-18.

Huang, J., "Part 19—Oct. 21: Interbike Bits and Baubles," Interbike Show, Las Vegas, Nevada, USA, Sep. 22-26, 2008, Cyclingnews.com, [Online] [Retrieved on Oct. 21, 2008] Retrieved from the Internet<URL:http://www.cyclingnews.com/tech/2008/shows/interbike08/?id=result . . . >.

Non-Final Rejection for U.S. Appl. No. 12/498,890 mailed Aug. 30, 2011, 21 Pages.

Non-Final Rejection for U.S. Appl. No. 13/665,594 mailed Mar. 29, 2013, 25 Pages.

Norouznezhad, E. et al. "A High Resolution Smart Camera with GigE Vision Extension for Surveillance Applications," Second ACM/IEEE International Conference on Distributed Smart Cameras, 2008, 8 pages.

PCT International Search Report and Written Opinion, PCT Application No. PCT/US2009/049821, Sep. 3, 2009, 8 pages.

Sun, X. et al. "Region of Interest Extraction and Virtual Camera Control Based on Panoramic Video Capturing," IEEE Transactions on Multimedia, 2005, pp. 981-990, vol. 7, issue 5.

"Tekkno Trading Project—Brandnews," NSP, Jan. 2008, p. 59.

Volk, W., "Go Pro's Digital Hero Camera," Divester, Posted Dec. 5, 2008, [Online] [Retrieved on Sep. 16, 2009] Retrieved from the Internet<URL:http://www.divester.com/2006/12/05/go-pro-digital-hero-camera/>.

(56) References Cited

OTHER PUBLICATIONS

YourDealer, "Aputure Gigtube Digital Screen Remote Viewfinder gives you more remote control with most DSLRs," 2009 Deals-World.com, Apr. 11, 2010, 3 pages, [Online] [Retrieved on Feb. 11, 2015] Retrieved from the Internet<URL:http://www.deals-world.com/deals/2010/04/11/aputure-gigtube-digital-screen-remote-viewfinder-gives-you-more-remote-control-with-most-dslrs/, Apr. 11, 2010.

Ion USA, "Wi-Fi PODZ," Date Unknown, 2 pages. [Online] [Retrieved Oct. 11, 2016] Retrieved from the internet <https://usa.ioncamera.com/shop/wi-fi-podz/>.

Re-Fuel, "24hr Action Pack Battery for GoPro Hero4, Hero3+ & Hero3," Date Unknown, 5 pages. [Online] [Retrieved Oct. 11, 2016] Retrieved from the internet <https://re-fuel.com/action-packs/24hr-action-battery-pack.html>.

United States Office Action, U.S. Appl. No. 14/132,554, Feb. 26, 2016, 31 pages.

United States Office Action, U.S. Appl. No. 14/132,554, Dec. 3, 2015, 28 pages.

United States Office Action, U.S. Appl. No. 14/132,554, Apr. 24, 2015, 13 pages.

youtube.com, Video for "The Air Pro Wi-Fi Podz," Aug. 18, 2014, one page, [Online] [Retrieved Oct. 11, 2016] Can be retrieved from the internet <URL:https://www.youtube.com/watch?v=YpWZ44aCdGA>.

youtube.com, Video for "The WiFi PODZ Tutorial," Jun. 15, 2012, two pages. [Online] [Retrieved Oct. 11, 2016] Can be retrieved from the internet <URL:https://www.youtube.com/watch?v=kGGwGobzQBg>.

* cited by examiner

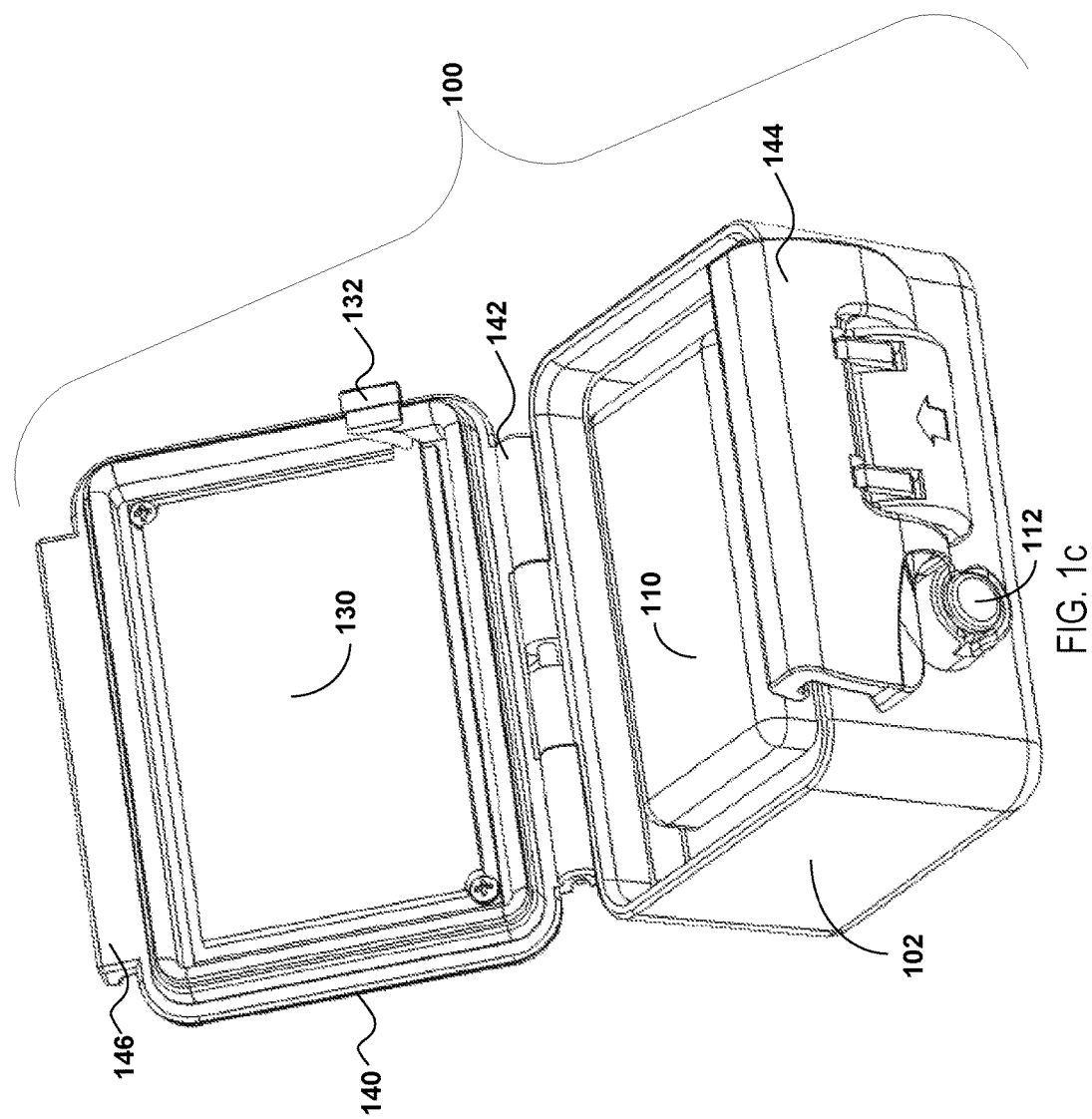

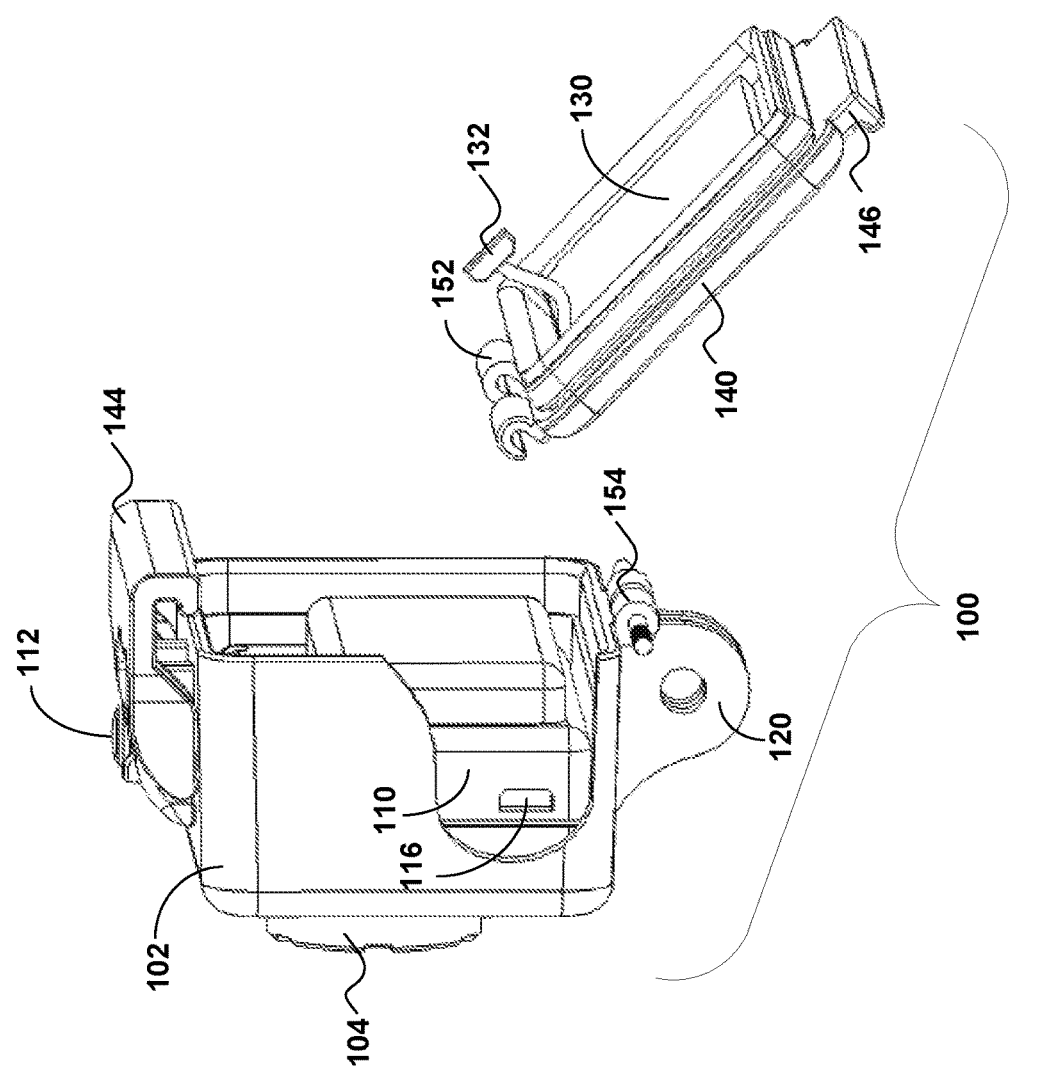

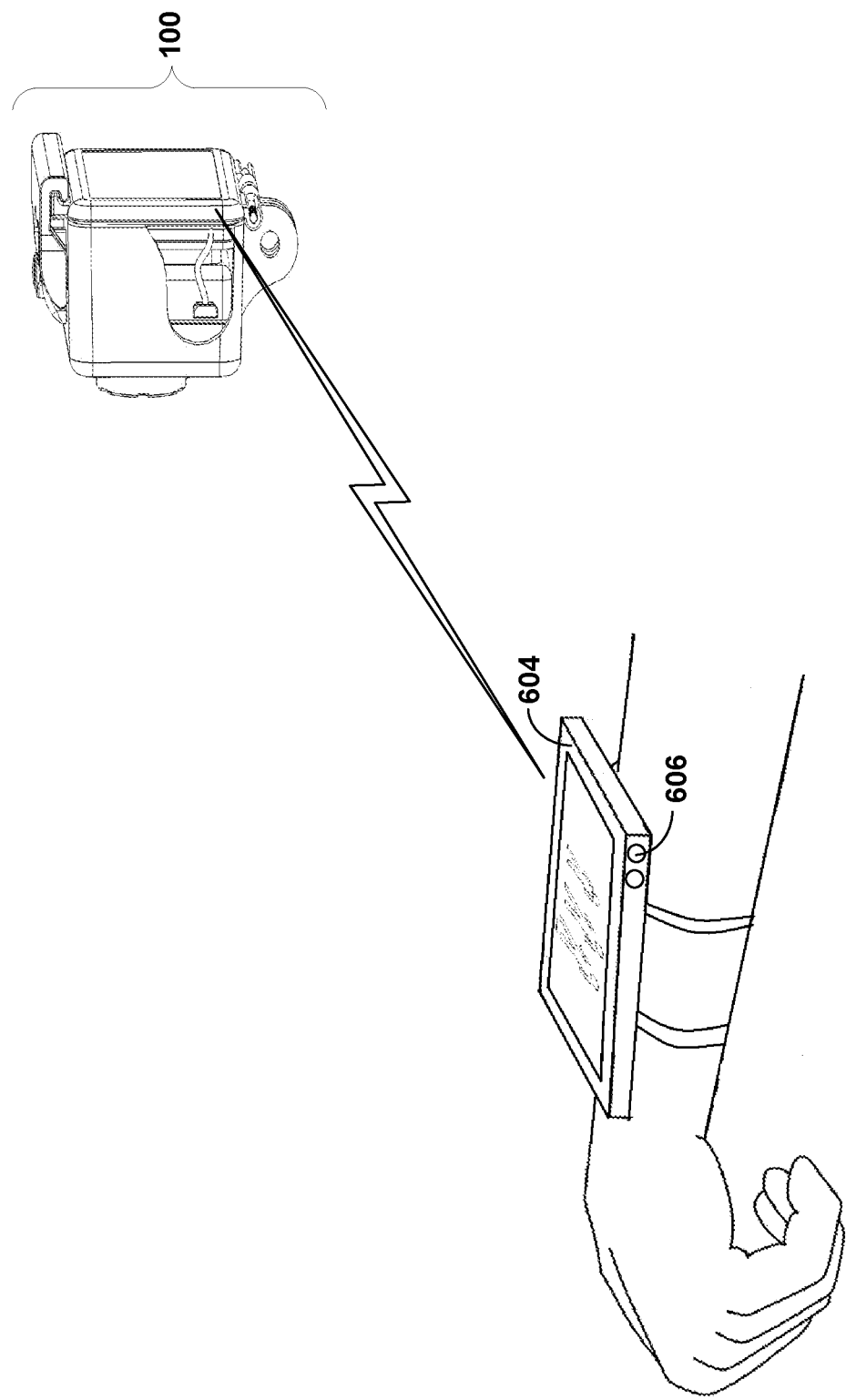

CAMERA HOUSING WITH INTEGRATED EXPANSION MODULE

RELATED APPLICATIONS

This application is a continuation of U.S. patent application Ser. No. 14/132,554 entitled "Camera Housing with Integrated Expansion Module" to Nicholas D. Woodman filed on Dec. 18, 2013, which is a continuation of U.S. patent application Ser. No. 13/665,594 entitled "Camera Housing with Integrated Expansion Module" to Nicholas D. Woodman filed on Oct. 31, 2012, now U.S. Pat. No. 8,638,392, which is a continuation of U.S. patent application Ser. No. 13/469,926 entitled "Camera Housing with Integrated Expansion Module" to Nicholas D. Woodman filed May 11, 2012, now U.S. Pat. No. 8,325,270, which is a divisional of U.S. patent application Ser. No. 12/498,890 entitled "Camera Housing with Integrated Expansion Module," to Nicholas D. Woodman filed Jul. 7, 2009, now U.S. Pat. No. 8,199,251, which claims the benefit of U.S. Provisional Patent Application No. 61/078,756, entitled "Camera Housing with Integrated Expansion Module" filed on Jul. 7, 2008, the contents of which are each hereby incorporated by reference.

BACKGROUND

1. Technical Field

This disclosure relates to a camera housing, and more specifically, to a camera housing with an integrated expansion module for adding expanded features to an existing camera.

2. Description of the Related Arts

The problem of conveniently carrying, accessing, and using a camera under various operating conditions has existed since the beginning of hand-held photography. It has become even more of a problem in recent years as a growing number of photographers attempt to take action photographs or videos while participating in fast-paced physical activities such as surfing, snorkeling, skiing, mountain biking, kayaking, rafting and so on.

In order to accommodate photography during such physical activities, camera manufacturers have produced cameras that are simple to operate, low cost, lightweight, and have compact form factors. These cameras can be secured using various mounts, harnesses, or straps to allow a user to keep one or more hands free for the physical activity. For example, camera wrist strap systems are available that provide a compact and lightweight camera together with a strap for securing the camera to a user's wrist. This configuration allows the user to easily access, operate, and then quickly secure the camera. Furthermore, the camera is small and light enough that it does not handicap the user while engaging in physical activity. Alternatively, helmet style camera systems allow a user to mount a compact and lightweight camera to a helmet. Other types of camera systems may include mounts for securing a camera to a bumper or windshield of a car to capture images or video while driving.

While such camera systems have become increasingly popular among photographers, these camera systems often lack features available in more traditional cameras. For example, wrist-mounted or helmet mounted camera systems often lack display screens in order to keep the camera systems small, lightweight, and low cost. While features such as a display screen may be desirable in some scenarios, it may not be useful in others scenarios. For example, a display screen would not be useful when the camera is mounted to a helmet, but may be useful when the camera is strapped to a wrist. Thus, a user may be reluctant to purchase a camera that includes the feature, particularly if the feature adds to the cost, physical size, and weight of the camera. Furthermore, as camera manufacturers produce cameras with new and/or improved features, users may become frustrated by the need to periodically purchase new cameras in order to have the new features available to them. There is lacking, inter alia, a camera system that provides expanded electronic functionality to an existing camera.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1a illustrates a first view of an embodiment of a camera housing with a door in an open position.

FIG. 3 illustrates a view of an embodiment a camera housing with a door detached from the housing.

FIG. 6 illustrates an embodiment of camera system with a shot positioning module communicatively coupled to a remote preview screen.

DETAILED DESCRIPTION

Figure 1A:
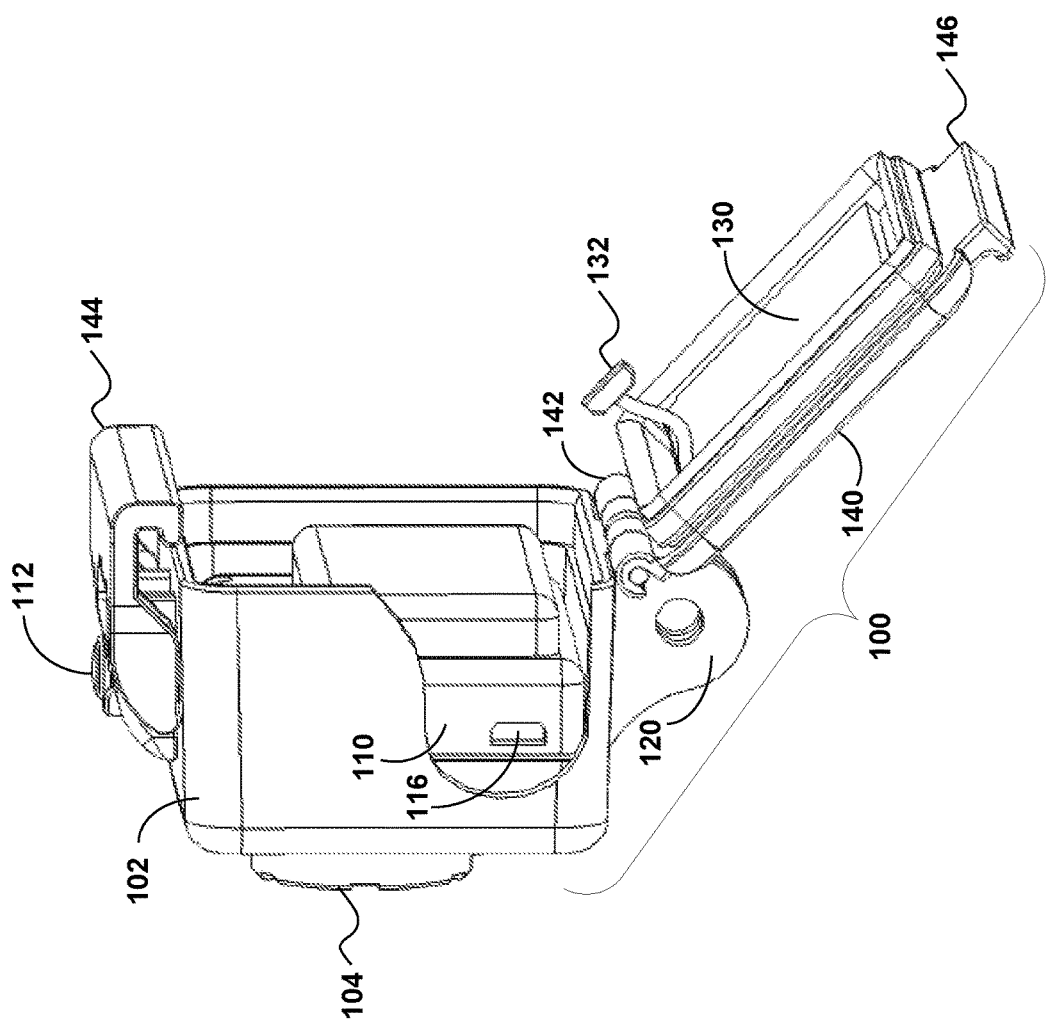
FIG. 1b illustrates a second view of an embodiment of a camera housing with a door in an open position.
FIG. 1c illustrates a third view of an embodiment of a camera housing with a door in an open position.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera system comprises a first portion of a camera housing structured to partially enclose a removable camera, and a second portion of a camera housing (i.e. a door) detachable from the first portion. The first portion of the camera housing includes a front face, a top face, a bottom face, a left side face, and a right side face. The door includes a back face structured to house an expansion module for interfacing with the camera to perform a camera function. An outer hinge structure located on a bottom edge of the door detachably couples to an inner hinge structure located on the bottom edge of the first portion of the housing. The outer and inner hinge structures form a hinge when coupled such that the door pivotally attaches to the first portion of the housing about the hinge. A first fastening structure is located on the top face of the first portion of the camera housing and detachably couples to a second fastening structure located on the top edge of the removable door such that the door is secured to the first portion of the camera housing in a closed position when the first fastening structure is coupled to the second fastening structure. An expansion interface cable communicatively couples to the expansion module for detachably coupling to a camera interface on the camera. The expansion interface cable facilitates communication of data between the expansion module and the camera when coupled to execute the camera function.

In a second aspect, an apparatus comprises a first housing portion having a front face with four sides structured to form a cavity to receive an electronic device, and a second housing portion detachably coupled with the first housing portion opposite the front face of the first housing portion. The first and second housing portion are collectively structured to enclose the electronic device within the cavity. The second housing portion further includes electronics including a communications interface. An interface cable has a first coupling interface for communicatively coupling the communication interface of the second housing portion and a second coupling interface for communicatively coupling the electronic device. The interface cable facilitates communication between the electronic device and the electronics within the second housing portion.

In a third aspect, a camera system comprises a camera body housing a camera. An expansion module detachably couples to the camera body for interfacing with the camera to perform a camera function. A first portion of a hinge structure positioned near an edge of the camera body detachably couples with a second portion of a hinge structure positioned near an edge of the expansion module. The first and second portions of the hinge structure form a hinge when coupled such that the expansion module is rotatable about the hinge. A first electrical connector positioned near an edge of the camera body opposite the first portion of the hinge structure detachably couples to a second reciprocal electrical connector positioned near an edge of the expansion module opposite the second portion of the hinge structure. The first and second electrical connector electrically couple the camera and the expansion module when coupled to facilitate data communication between the camera and the expansion module for executing the camera function.

Camera System Configuration

Figure 1B:
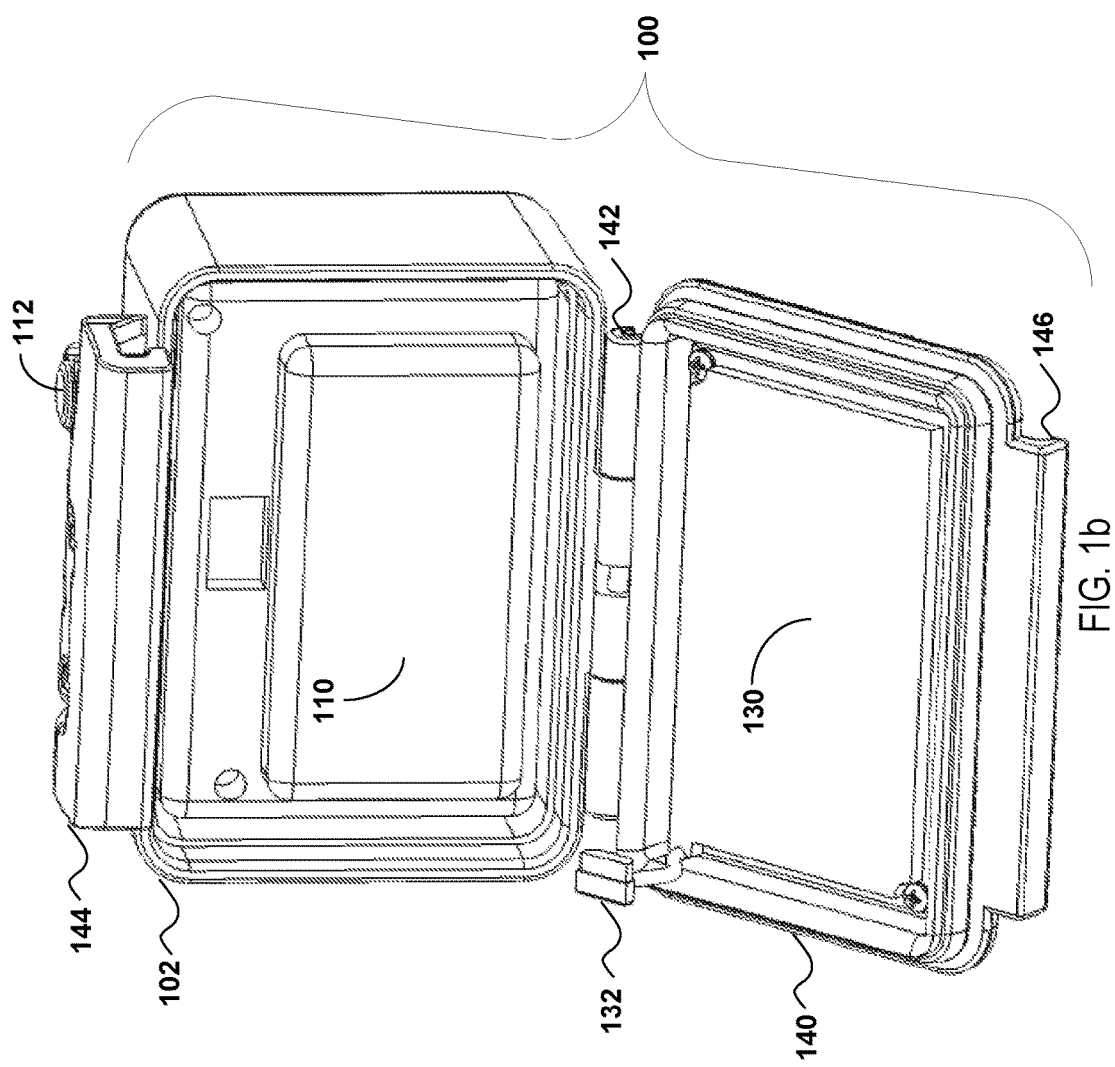

A camera system includes a camera housing with an embedded expansion module for providing one or more expanded features to an existing camera. It is noted that the camera can be configured as a still picture camera or a moving picture camera (e.g., video). FIGS. 1a-c illustrate various views of the camera system in accordance with one embodiment. The camera system includes, among other components, a first housing portion 102 and a second housing portion 140 (i.e. door 140), collectively referenced herein as housing 100. In one embodiment, the first housing portion 102 includes a front face with four sides (i.e. a top side, bottom side, left side, and right side) structured to form a cavity that receives a camera 110 (e.g. a still camera or video camera). A second housing portion 140 (or door 140) detachably couples with the first housing portion 102 opposite the front face of the first housing portion. The first housing portion 102 and second housing portion 140 are collectively structured to enclose the camera 110 within the cavity when the second housing portion 140 is secured to the first housing portion 102 in a closed position.

The camera housing 100 encloses and protects the camera 110. The camera housing 100 is particularly advantageous when using the camera 110 during periods of physical activity when the camera 110 may be susceptible to damage. For example, without the housing 100, the camera 110 may become scratched or otherwise damaged when used during physical activity. The camera 110 is removable from the housing 100 so that if the housing 100 becomes scratched or damaged, it can be easily replaced at a much lower cost than replacing the camera 110 itself.

In one embodiment, the camera 110 (and camera housing 100) has a small form factor (e.g., a height of approximately 4 to 6 centimeters, a width of approximately 5 to 7 centimeters, and a depth of approximately 2 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects the camera 110 from water when used, for example, while surfing or scuba diving.

Portions of the camera housing 100 may include exposed areas to allow a user to manipulate buttons on the camera 110 that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera 110 is substantially aligned with the outer shutter button when the camera 110 is secured within the camera housing 100. The shutter button of the camera 110 is operationally coupled to the outer shutter button 112 so that pressing the outer shutter button 112 allows the user to operate the camera shutter button. In one embodiment, the front face of the camera housing 100 includes a lens window 104 structured so that a lens of the camera 110 is substantially aligned with the lens windows 104 when the camera 110 is secured within the camera housing 100. The lens window 104 can be adapted for use with either conventional lens of the camera 110, a wide angle lens, or any other specialized camera lens. In one embodiment, the lens window 104 and/or lens of the camera 110 is removeably attachable to the first portion of the camera housing 102 and comprises a third portion of the housing 100. In this embodiment, the lens window 104 comprises a waterproof seal so as to maintain the waterproof aspect of the housing 100. Alternatively, the lens window 104 is permanently fixed to the housing portion 102.

In one embodiment, the camera housing 100 includes one or more securing structures 120 for securing the camera housing 100 to one of a variety of mounting devices. For example, in one embodiment the camera housing 100 can be secured to a wrist strap that secures the camera to a user's wrist. An example of such a camera system is described in U.S. Pat. No. 6,955,484 entitled "Harness System for Attaching Camera to User" to Nicholas Woodman, the content of which is incorporated by reference herein in its entirety. In another embodiment, the housing 100 couples to a helmet mount via the securing structure 120 for mounting the camera to a helmet. In yet another embodiment, a car mount for mounting the camera to a car couples to the securing structure 120. In yet other embodiments, other type of mount, strap, or securing devices known to those of ordinary skill in the art couple to the securing structure 120 for securing the camera to various other apparatuses or body parts.

Figure 2A:
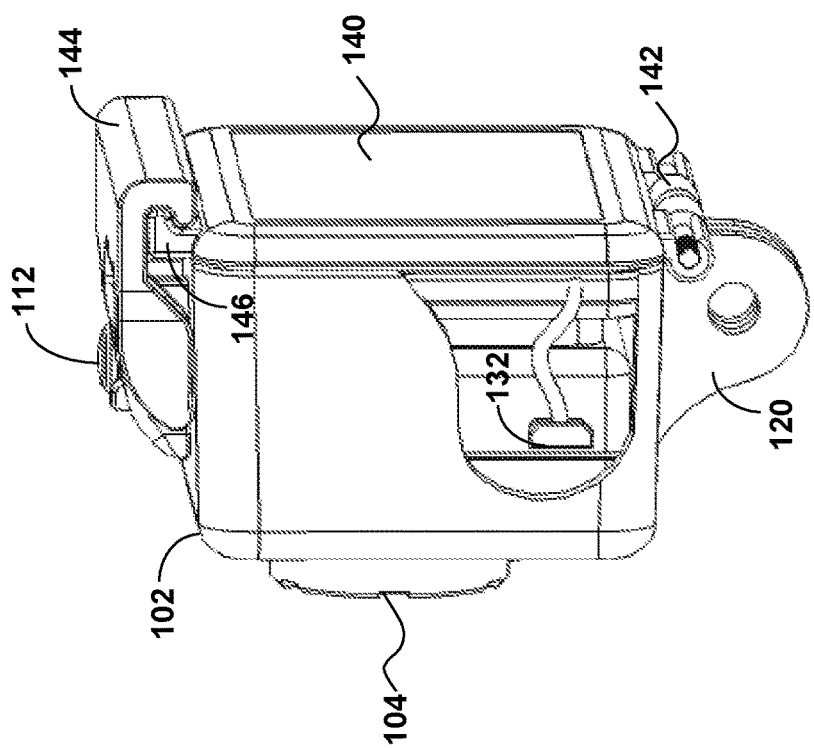
FIG. 2a illustrates a first view of an embodiment a camera housing with a door in an closed position.
Figure 2B:
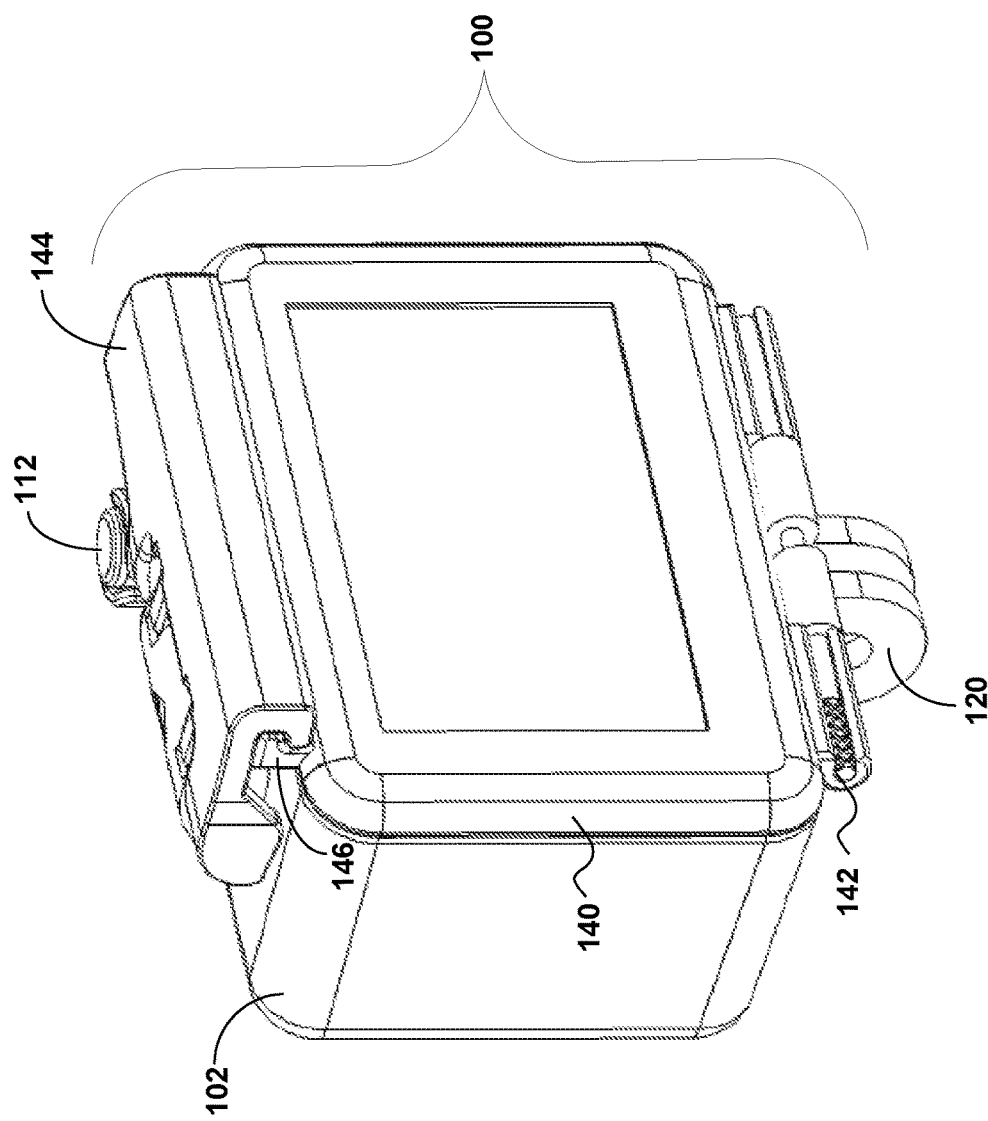
FIG. 2b illustrates a second view of an embodiment a camera housing with a door in an closed position.

In one embodiment, the second housing portion 140 comprises a door 140 (shown in the open position in FIGS. 1a-c) that allows the camera 110 to be removed from the housing 100. The door 140 of the housing 100 pivots around a hinge 142 that allows the door 140 to be opened or shut. In one embodiment, a first fastening structure 144 located on the top face of the camera housing 100 detachably couples to a second fastening structure 146 on the door 140 of the housing 100. The fastening structures 144, 146 secure the door 140 to the first portion 102 of the camera housing 100 in a closed position when coupled. FIGS. 2a-b illustrate embodiments of the camera housing 100 with the door 140 secured in the shut position using the fastening structures 144, 146. For example, in one embodiment, the fastening structure 144 comprises a hook-shaped lateral bar and the fastening structure 146 comprises an L-shaped bar. The fastening structure 144 can pivot upwards to allow the door 140 to close and can then be pressed down around the fastening structure 146 to hold the door 140 in the closed position. In different embodiments, fastening structures for securing the door 140 can include, for example, a button assembly, a buckle assembly, a clip assembly, a hook and loop assembly, a magnet assembly, a ball and catch assembly, and an adhesive assembly, or any other type of securing mechanism.

In one embodiment, the housing 100 includes a watertight seal so that the housing 100 is waterproof when the door 140 is shut. For example, in one embodiment, the door 140 includes a sealing structure positioned on edges of the door 140. The sealing structure provides a watertight seal between the first portion of the camera housing 102 and the door 140 when the first securing structure 144 on the top face of the camera housing 100 is coupled to the second securing structure 146 on the top edge of the door 140.

In one embodiment, the door 140 detachably couples from the first housing portion 102 at the hinge 142. FIG. 3 illustrates an example embodiment of the camera housing 100 with the door 140 uncoupled from the first housing portion 102. In one embodiment, an outer hinge structure 152 on the bottom edge of the door 140 detachably couples to a inner hinge structure 154 on the bottom edge of the first housing portion 102 to form the hinge 142. For example, in one embodiment, the outer hinge structure 152 comprises one or more hook-shaped protrusions structured to securely fasten to a rod-shaped member of the inner hinge structure 154. Other mechanisms for coupling the door 140 to the housing 100 may also be used in various alternative embodiments.

The door 140 of the camera housing 100 has an integrated expansion module 130 including a communications interface 132 for communicatively coupling to the camera 110. The integrated expansion module 130 comprises electronics that add one or more functions to the camera 110. The interface 132 facilitates data communication between the integrated expansion module 130 and a coupling interface 116 of the camera 110 in order to provide expanded functionality to the camera 110.

In one embodiment, the interface 132 on the housing 100 communicatively couples to a camera interface 116 commonly available on existing camera 110. For example, most digital cameras include an interface for transferring images and/or video captured by the camera to a PC or other storage device. Such an interface also often allows a user to supply firmware updates to the camera 110. By applying appropriate firmware updates to the camera 110 and/or by receiving and manipulating image data retrieved from the camera 110, the integrated expansion module 130 can provide the expanded features to the camera 110. In addition, the interface can be used for various data transfers between the camera and the expansion module 130 to facilitate a variety of camera functions as will be described below. In one embodiment, the interfaces 132, 116 comprises a Universal Serial Bus (USB) interface (e.g., USB A, USB B, mini USB (A or B) or micro USB (A, B or AB)). Alternatively, a different type of interface may be used such as, for example, a serial interface, a parallel interface, a FIREWIRE interface, an ETHERNET interface, and so on. In other embodiments, a wireless interface (e.g., BLUETOOTH) may be used.

In one embodiment, the integrated expansion module 130 is removable from the door 140 so that different expansion modules 130 providing different features to the camera can be swapped in and out. Alternatively, the entire door 140 is detachable from the first housing portion 102 (as illustrated in the embodiment of FIG. 3) and can be swapped with other doors 140 having different expansion modules 130 providing different features. Examples of different expansion modules for use with the camera system 100 are described in further detail below.

Figure 4:
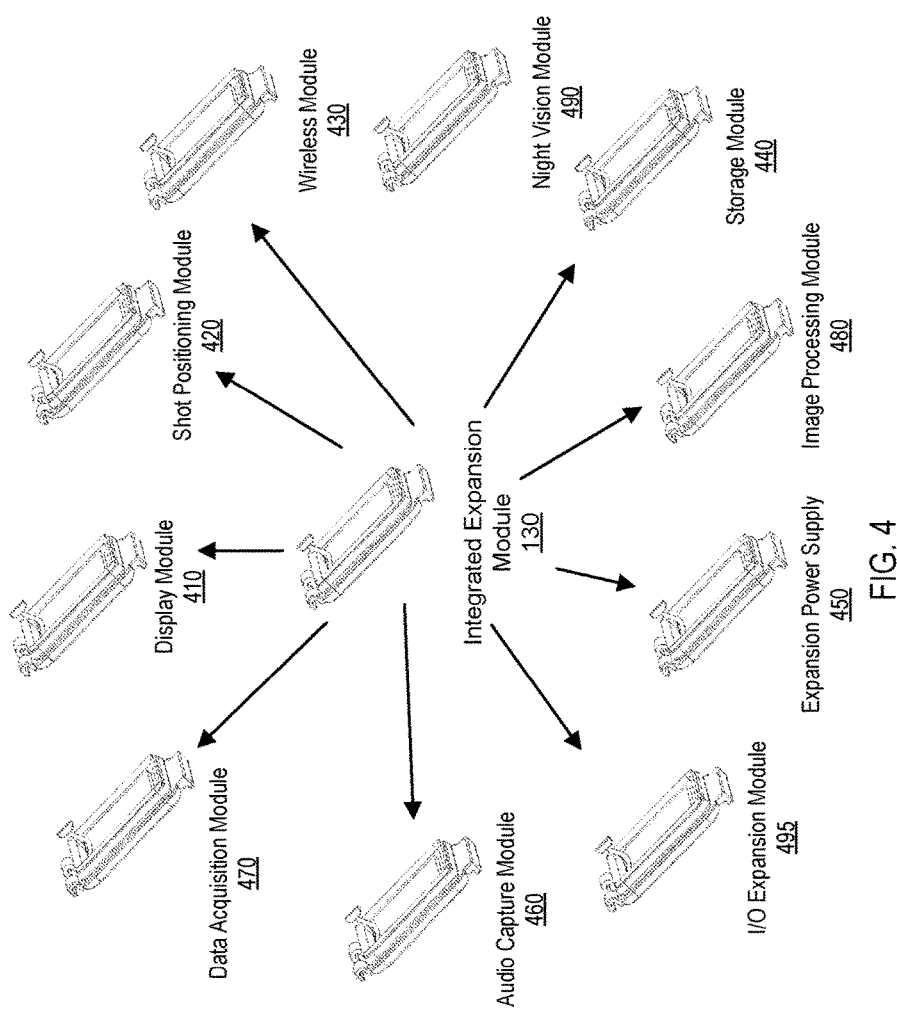
FIG. 4 illustrates a various embodiment of expansion modules for use with the camera system.

FIG. 4 illustrated a variety of different types of integrated expansion module 130 providing different functions to the camera 110 depending on the user's needs. According to various embodiments, the integrated expansion module 130 can comprise one or more of a display module 410, a shot positioning module 420, a wireless module 430, a storage module 440, an expansion power supply 450, an audio capture module 460, a data acquisition module 470, an image processing module 480, a night vision module 490, and a expansion input/output (I/O) module 495. An expansion module 130 may also comprise a module that includes a combination of functions (e.g., a storage module 440 and an audio capture module 460 enclosed within a single housing portion 140). In a typical use, a user may have several different types of expansion modules 410-495 (collectively referred to as expansion module 130 for ease of discussion) available. The user can then swap in and out the different expansion modules 130 depending on the desired functions. Embodiments of the camera system 100 using the different types of expansion modules 130 (e.g., 410-495) are described in more detail below.

Camera Housing With Display Module

Figure 5A:
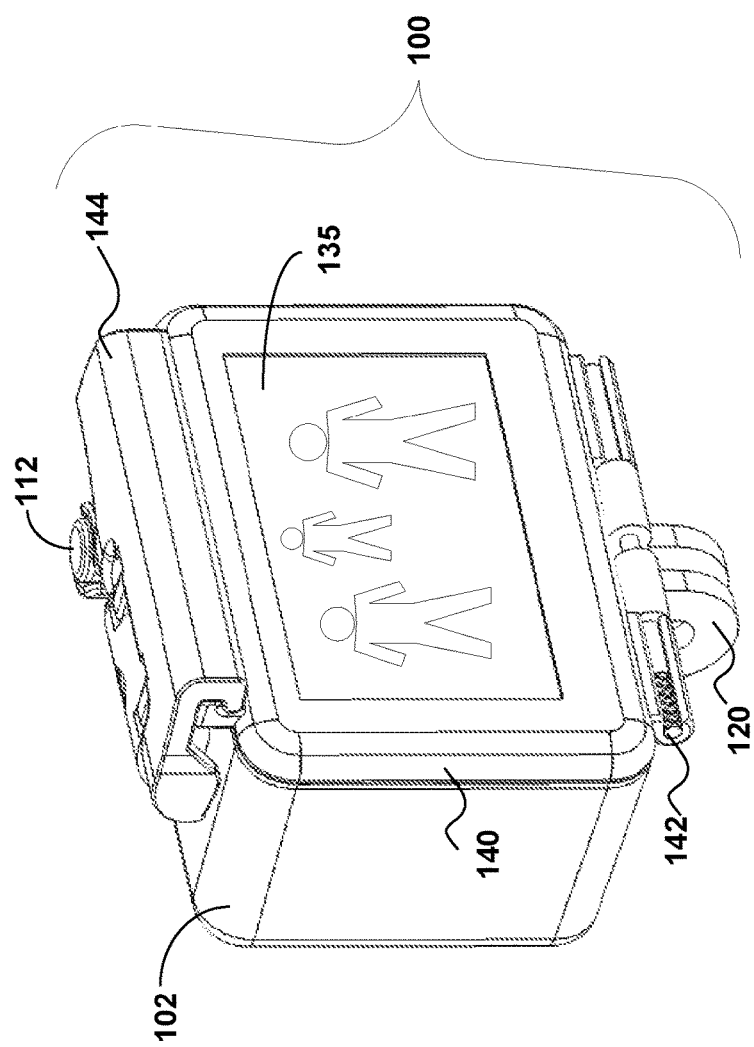
FIG. 5a illustrates a first view of an embodiment a camera housing with an integrated display module.
Figure 5B:
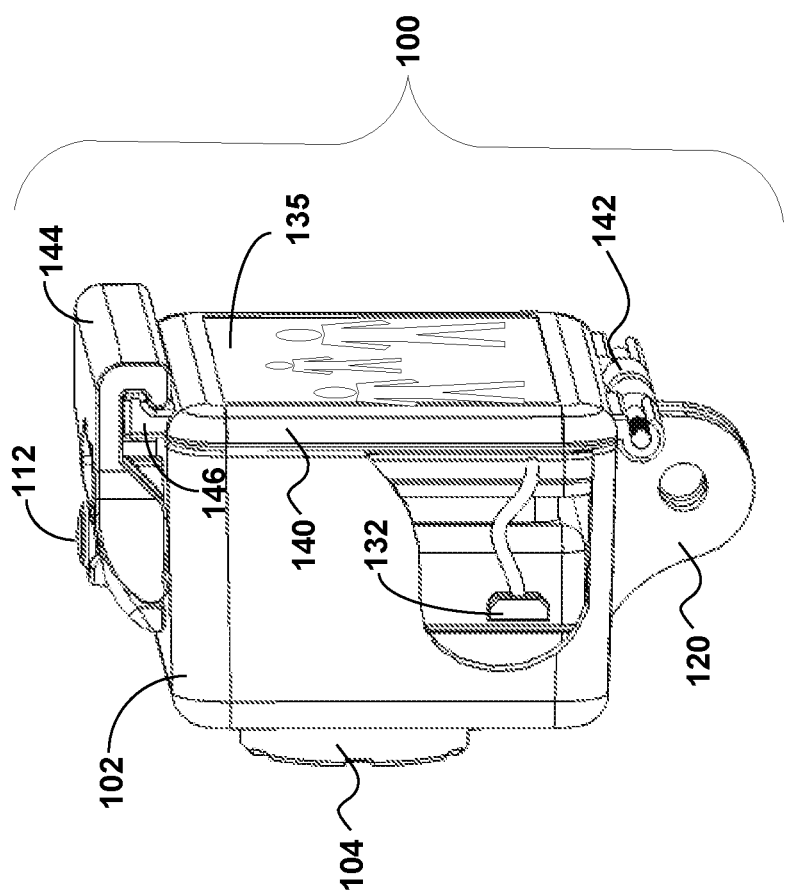
FIG. 5b illustrates a second view of an embodiment a camera housing with an integrated display module.

In one embodiment, the integrated expansion module 130 of the camera housing 100 comprises an integrated display module 410 to add display functions to a camera 110 that does not have a built in display. An example embodiment of a camera housing 100 with an integrated expansion module 130 having a display module 410 illustrated in FIGS. 5a-5b. In this embodiment, the housing 100 includes a display screen 135 (e.g., a Liquid Crystal Display (LCD)) externally viewable from the back of the housing 100. The display module 410 includes display control logic for adding display functions to the existing camera 110 without a built in display. For example, the display module 410 may digitally display the image currently in view of the camera lens on the display screen 135. This provides the user with a preview image before taking a picture or while recording video and allows the user to operate the camera 110 without having to peer directly through a viewfinder. Additionally, the display module 410 may allow the user to view previously captured and stored images or video stored on the exterior display screen 135.

Camera Housing With Shot Positioning System

In another embodiment, the integrated expansion module 130 of the camera housing 100 comprises a "shot" (e.g., photo or video shot) positioning module 420 configured to assist the user in aligning the camera when the viewfinder or external display is outside the user's view (e.g., when the housing 100 is mounted to a helmet). One example embodiment of a system using the shot positioning module 420 is illustrated in FIG. 6. In this embodiment, the shot positioning module 420 includes a communication interface that transmits image information from the camera 110 to a remote preview screen 604 that can be attached to a user's arm or wrist. In one embodiment, the shot positioning module 420 includes a wireless interface (e.g., Bluetooth, Radio Frequency (RF), infrared (IR), 801.11a/b/g/n or other wireless protocol) that communicates with the remote preview screen 504.

The wireless interface transmits the image currently in view of the camera lens to the remote preview screen 604 for display. In one embodiment, the shot positioning module 420 communicates with the remote preview screen 604 via a two-way interface. In this embodiment, the remote preview screen 604 may have control buttons 606 that allow the user to control various camera operations from the remote preview screen 604. Alternatively, the communication interface may be a one-way communication such that the remote preview screen 604 only receives and displays image information from the camera 110 but does not send any information or controls to the camera 110. In this embodiment, the user still controls the camera 110 via the built-in camera buttons (e.g., the shutter button 114).

Camera Housing With Wireless Module

In another embodiment, the integrated expansion module 130 comprises an integrated wireless module 430 that adds wireless connectivity to a camera 110 lacking wireless features. The wireless module 430 may include, for example a Bluetooth module, a Radio Frequency (RF) transceiver, an infrared (IR) transceiver, an 802.11a/b/g/n transceiver, or any other wireless device. For example, the wireless module 430 could be used to allow the user to wirelessly download stored images and/or video from the camera 110 to a personal computer (PC), e.g., a server computer, a desktop computer, a laptop, a netbook, or a smartphone. Alternatively, images and/or video can be captured and wirelessly downloaded in real-time from the camera 110. The wireless module 430 may also allow a user to wirelessly control operation of the camera 110. For example, if the camera 110 is mounted on a bumper of a car, the user could remotely control the camera 110 from inside the car via a remote control wirelessly coupled to the wireless module 430.

Camera Housing With Storage Module

In another embodiment, the integrated expansion module 130 comprises an integrated storage module 440. The storage module 440 provides additional storage space for storing captured images and/or movies. The storage module 440 may include any type of volatile or non-volatile memory including random access memories (RAMs), FLASH memory, magnetic or optical cards, or any type of media suitable for storing electronic data. Images or video captured by the camera 110 are transmitted to the integrated storage module 440 via the communication interface 132.

Camera Housing With Expansion Power Supply

In another embodiment, the expansion module 130 comprises an expansion power supply 450 for providing power to the camera 110. For example, the expansion power supply may include an expansion battery that supplements an internal battery of the camera 110 and provides additional battery life to the camera 110. In another embodiment, the expansion power supply 450 can include a solar charger that captures solar energy to recharge a battery. The expansion power supply may also be configured so that rechargeable batteries providing power to the camera can be recharged through an expansion power supply 450 that comprises an inductive charging element or a capacitive charging element. In the case of inductive charging, the communication interface 132 may couple with a inductive coil plate that inductively couples with the inductive charger (which has its own coil). In the case of conductive charging, the communications interface 132 is configured to receive a discharge from a capacitive power source that is the expansion power supply 450. Alternatively, the expansion power supply 450 couples directly to battery terminals of the camera 110 rather than coupling via the interface 132.

Camera Housing With Audio Capture Module

In yet another embodiment, the integrated expansion module 130 can include an audio capture module 460 (e.g., a microphone or an interface for an external microphone) to capture and/or store audio data. In this embodiment, the audio capture module 460 captures audio concurrently with the camera 110 capturing video. Alternatively, the audio capture module 460 can capture audio alone without any corresponding video.

Camera Housing With Data Acquisition Module

In yet another embodiment, the integrated expansion module 130 includes a data acquisition module 470 that acquires various data to store in association with images or video captured by the camera. For example, in one embodiment, the data acquisition module 130 capture Global Positioning System (GPS) data that provide positioning information. Such positioning information may be stored together with images and/or video so that the user can record where the images and/or video were taken. For example, in one embodiment, the GPS module automatically inserts a position stamp on a captured image or video indicating the location that the image or video was captured. Similarly, the data acquisition module 470 can include, for example, an accelerometer, altimeter, clock, thermometer, humidity sensor, barometer, heart rate meter, light sensor, and so on. Any of the captured information can be stored with photographs or video or automatically inserted into the images or video to provide the user with information relating to the captured scene.

Camera Housing With Image Processing Module

In yet another embodiment, the integrated expansion module 130 includes an image processing module 480. The image processing module 480 receives images and/or video from the camera and performs various image processing functions such as, for example, modifying brightness, contrast, saturation, hue, resolution, aspect ratio, and so on. In one particular embodiment, the image processing module converts images or videos captured in a 4:3 aspect ratio to a image or video 16:9 aspect ratio or vice versa. In one embodiment, the image processing module 480 includes a digital signal processor (DSP) chipset that is configured to "stretch" pixels gradually starting at a center of a captured image (stretch=0) working outward towards each edge and/or corner of the image (stretch=maximum_set). The number of directions for the stretch can be any integer. However, in one embodiment the number of directions of stretch are a factor of 2 for a 4 sided picture radiating in opposite directions from the center of an image. For example, the processing module 480 can stretch an image in 2 directions (any two opposite edges), 4 directions (each edge), 8 directions (each edge and each corner) and the like.

In an alternate embodiment, a wide angle lens couples with the camera 110 and captures images in 16:9 format and the image processing module 480 coverts it into a 4:3 format. In one embodiment the DSP is configured so that the captured 16:9 image is cropped into a 4:3 size. Alternately, the DSP is configured so that the pixels are "squeezed" with the maximum squeeze at the edges and corners (squeeze=maximum set) and the minimum or no squeeze closer to the center of the image (squeeze=0).

Camera Housing With Night Vision Module

In yet another embodiment, the integrated expansion module 130 can include a night vision module 490 to add night vision capabilities to an existing camera 110. The night vision module 490 may utilize any conventional night vision technology such as, for example, infrared night vision, thermal night vision, and so on. In one embodiment, the night vision module 490 operates with a specialized lens designed for night vision image and/or video capture.

Camera Housing With Expansion I/O Module

In yet another embodiment, the integrated expansion module 130 can include an expansion input/output (I/O) module 495 that allows other external devices to communicate with the camera 110 through a variety of possible interfaces. For example, the expansion I/O module 495 may adapt the standard communication interface of the camera 110 to be able to communicate with external devices via interfaces such as, for example, a USB interface, a serial interface, a parallel interface, a FIREWIRE interface, an ETHERNET interface, a wireless interface, and so on. The external device can then perform functions such as controlling operation of the camera 110, or acquiring and/or processing data from the camera 110.

Additional Embodiments

In other additional embodiments, the door 140 of the camera housing 100 can have various shapes and sizes to accommodate cameras 110 of different thicknesses and shapes. Thus, a user may have a set of removable doors 140 that can be swapped in and out depending on the size and shape of the camera 110 being used. In some embodiments, the camera 110 may also accommodate various expansion modules that attach directly to the body of the camera, an example of which is described below with reference to FIGS. 8a-b and 9a-b. Thus, various additional embodiments of the housing door 140 can also be sized and shaped to accommodate expandable cameras having expansion modules of different sizes and shapes. In one embodiment, a door 140 may have various cut-outs, vents, or other pass-throughs to provide improved cooling to the camera 110 and/or better audio capture if the camera 110 is equipped with a microphone. Thus, a user may swap between a vented camera door or a solid-bodied waterproof back door depending on the circumstances and the type of camera 110 being used.

The described housing 100 may also be adapted for a wider range of devices of varying shapes, sizes and dimensions besides cameras. For example, the housing 100 with expansion module 130 may be used to add expanded features to electronic devices such as cell phones, music players, PDAs, GPS units, or other portable electronic devices.

Expansion Module For Camera Body

In alternative embodiments, an expansion module 730 can couple directly to a camera body 702 as illustrated in FIGS. 7-9. The expansion module 730 can be functionally similar to the expansion module 130 described above. Although the illustrations show an expansion module 730 with a built-in display, the embodiments are not limited to display modules. Rather, the expansion module 730 can be functionally similar to any of the various expansion modules described above (i.e. display module 410, shot positioning module 420, wireless module 430, storage module 440, expansion power supply 450, microphone 460, data acquisition module 470, image processing module 480, night vision module 490, and expansion I/O module 495). In one embodiment, a user may swap in and out various types of the expansion module 730 depending on the functionality the user wishes to add the camera.

Figure 7A:
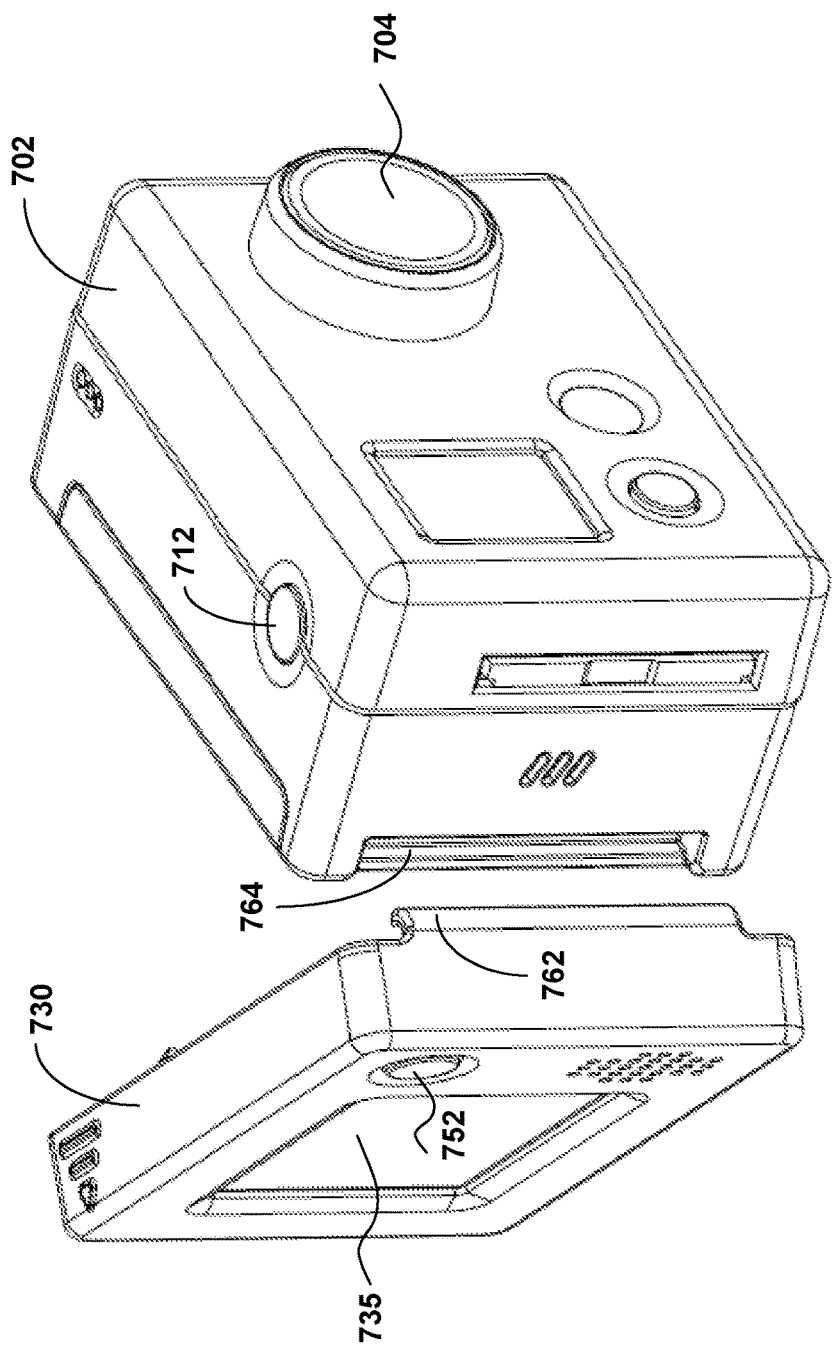
FIG. 7a illustrates a first view of an embodiment a camera with an expansion module detached from the camera body.
Figure 7B:
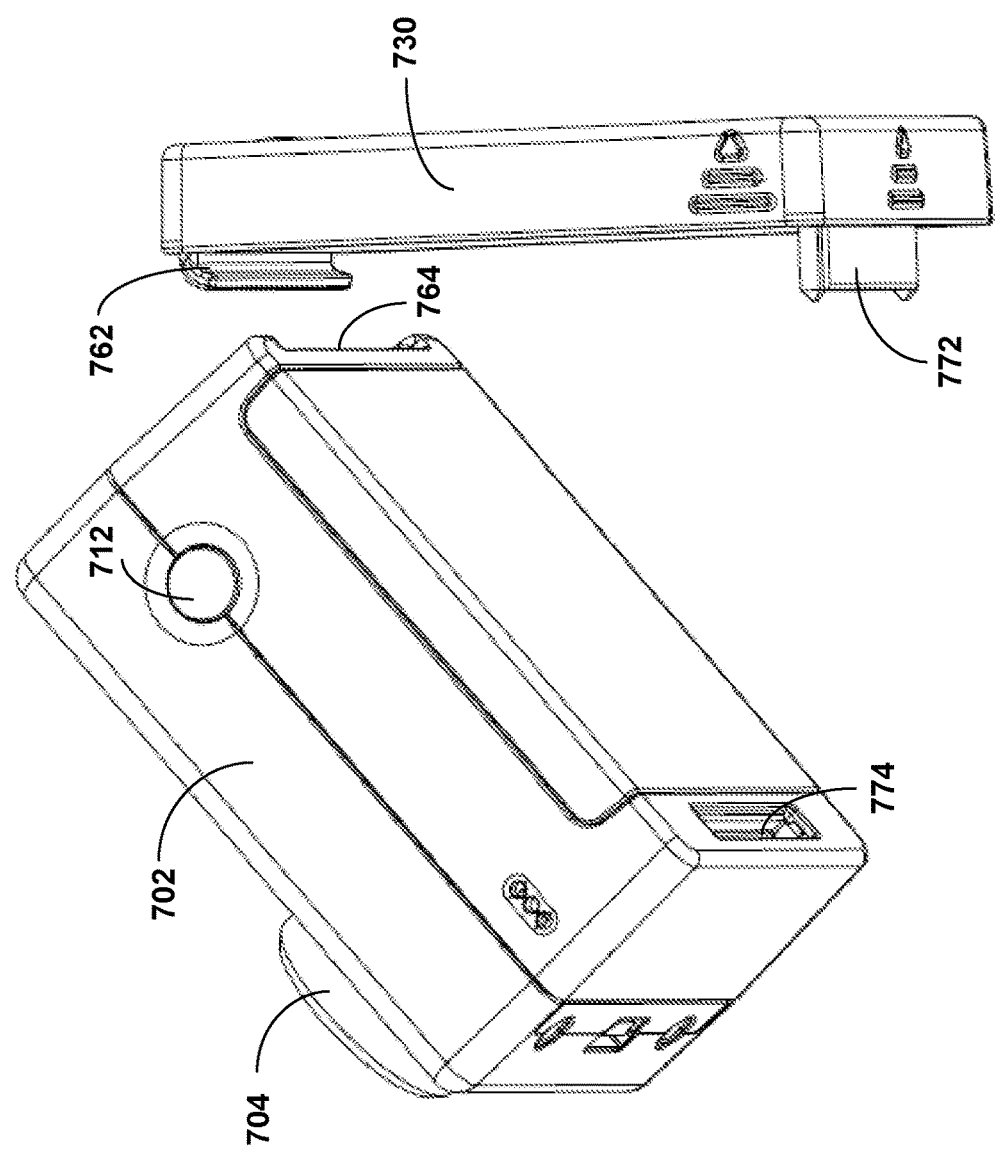
FIG. 7b illustrates a second view of an embodiment a camera with an expansion module detached from the camera body.

FIGS. 7a-b illustrate various views of an expansion module 730 detached from a camera body 702 according to this embodiment. The camera body 702 includes a shutter button 712, a lens window 704, a first portion of a hinge structure (e.g., hinge groove 764) positioned near an edge of the camera body 702, and a first portion of the an electrical connector (e.g., electrical groove 774) positioned near an edge of the camera body 702 opposite the hinge structure 764. In order to simplify the description, other conventional features of the camera body 702 are omitted from the FIGs. and the description that follows. The expansion module 730 includes a preview screen 735, an expansion function button 752, a second portion of a hinge structure (e.g., hinge connector 762) positioned near an edge of the expansion module 730, and a second portion of an electrical connector (e.g., electrical connector 772) that is reciprocal to the first portion of the electrical connector 774 on the camera body 702, and is positioned near an edge of the expansion module 730 opposite the hinge connector 762.

Figure 8A:
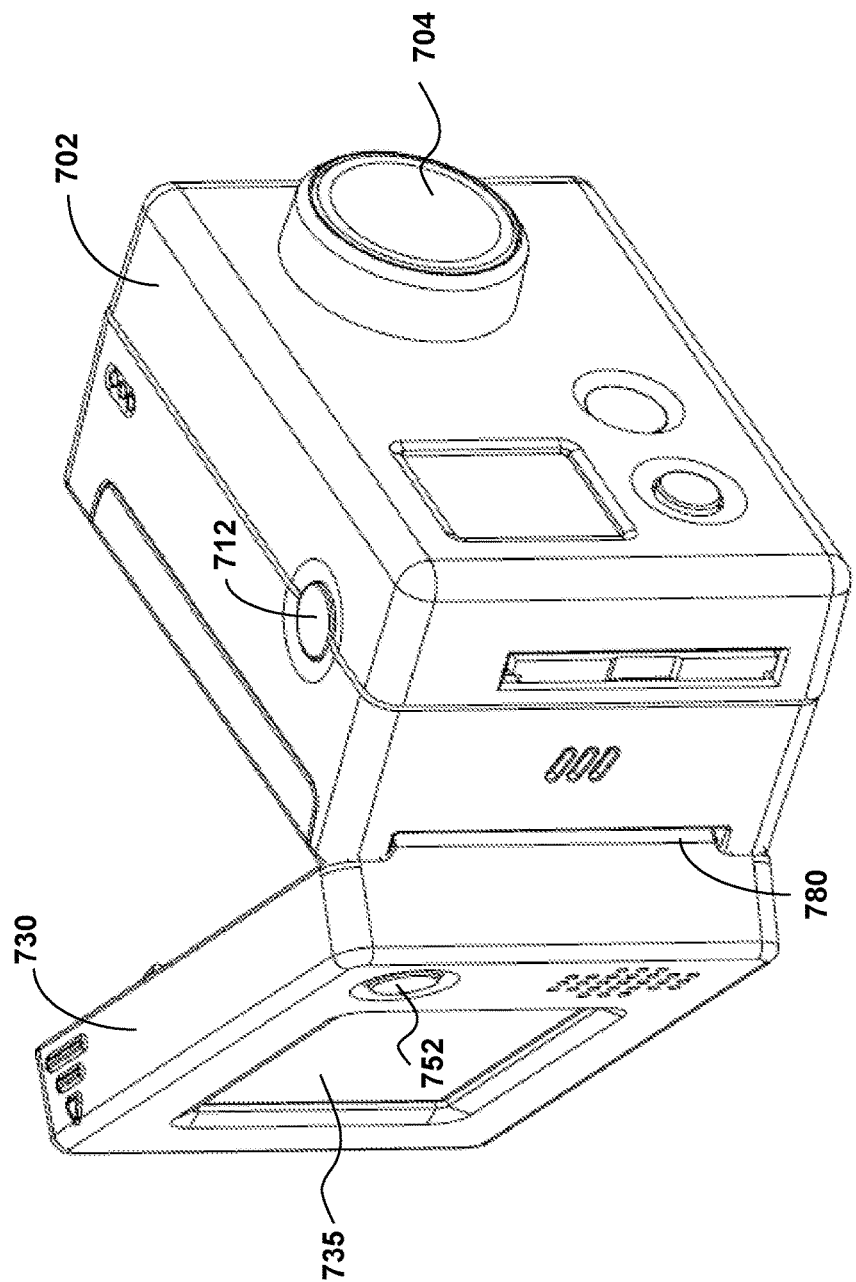
FIG. 8a illustrates a first view of an embodiment a camera with an expansion module attached to the camera body in an open position.
Figure 8B:
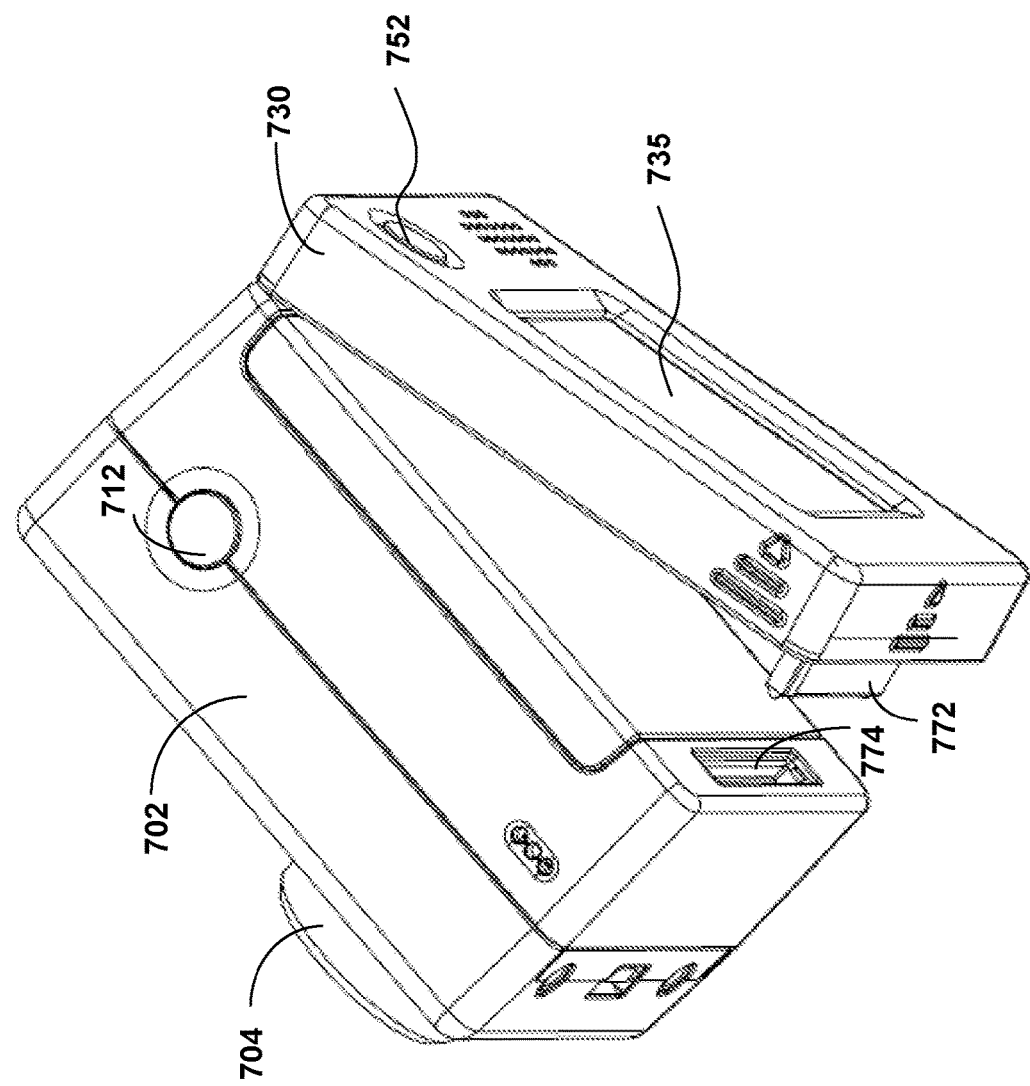
FIG. 8b illustrates a second view of an embodiment a camera with an expansion module attached to the camera body in an open position.

FIGS. 8a-b illustrate various views of the expansion module 730 partially coupled to the camera body 702 (i.e. in an open position). As illustrated, the hinge connector 762 of the expansion module 730 detachably couples to the hinge groove 764 of the camera body 702 to form a hinge 780. Once in place, the expansion module 730 is rotatable about the hinge 780 formed by the hinge connector 762 and hinge groove 764. In one embodiment, the hinge connector 762 and hinge groove 764 snap together so as to form a secure coupling between the camera body 702 and expansion module 730. The electrical connector 772 is adapted to fit snugly into the electrical groove 774 on the camera body 702. When connected, the electrical connector 772 and electrical connection groove 774 serve to both secure the expansion module 730 to the camera body and provide an electrical connection between the expansion module 730 and the camera body 702.

Figure 9A:
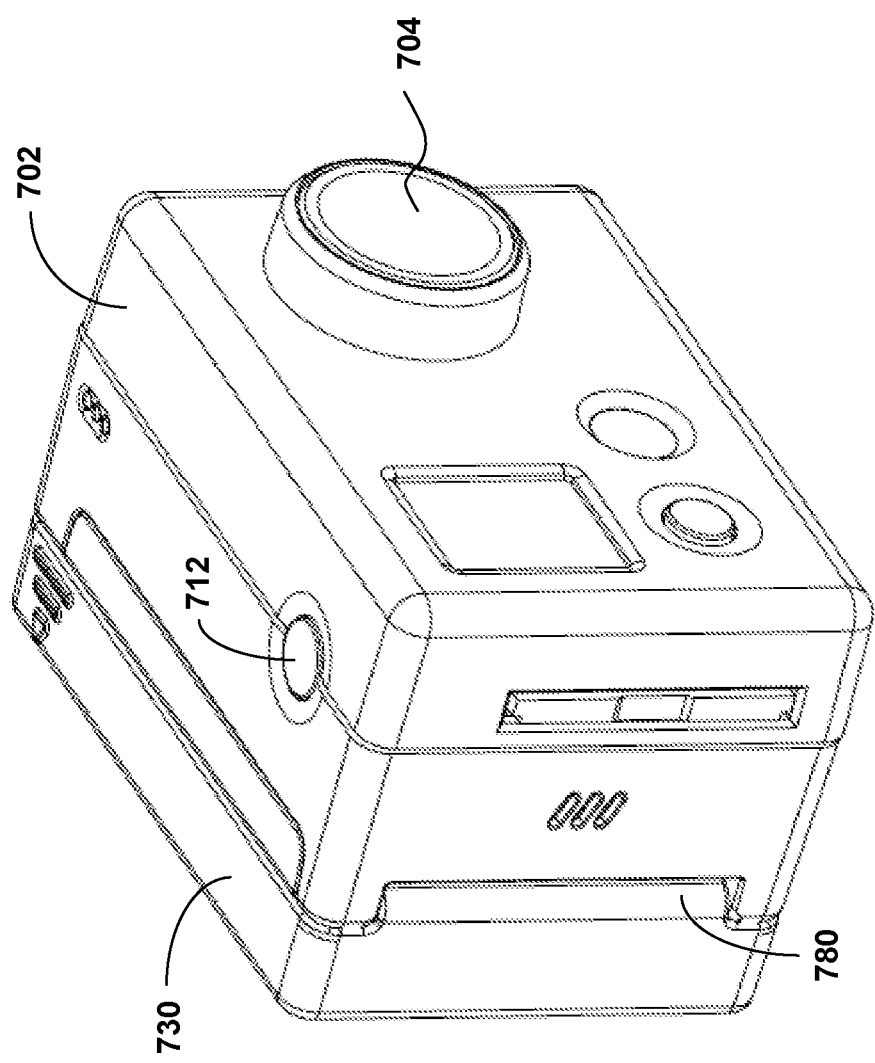
FIG. 9a illustrates a first view of an embodiment a camera with an expansion module attached to the camera body in an closed position.
Figure 9B:
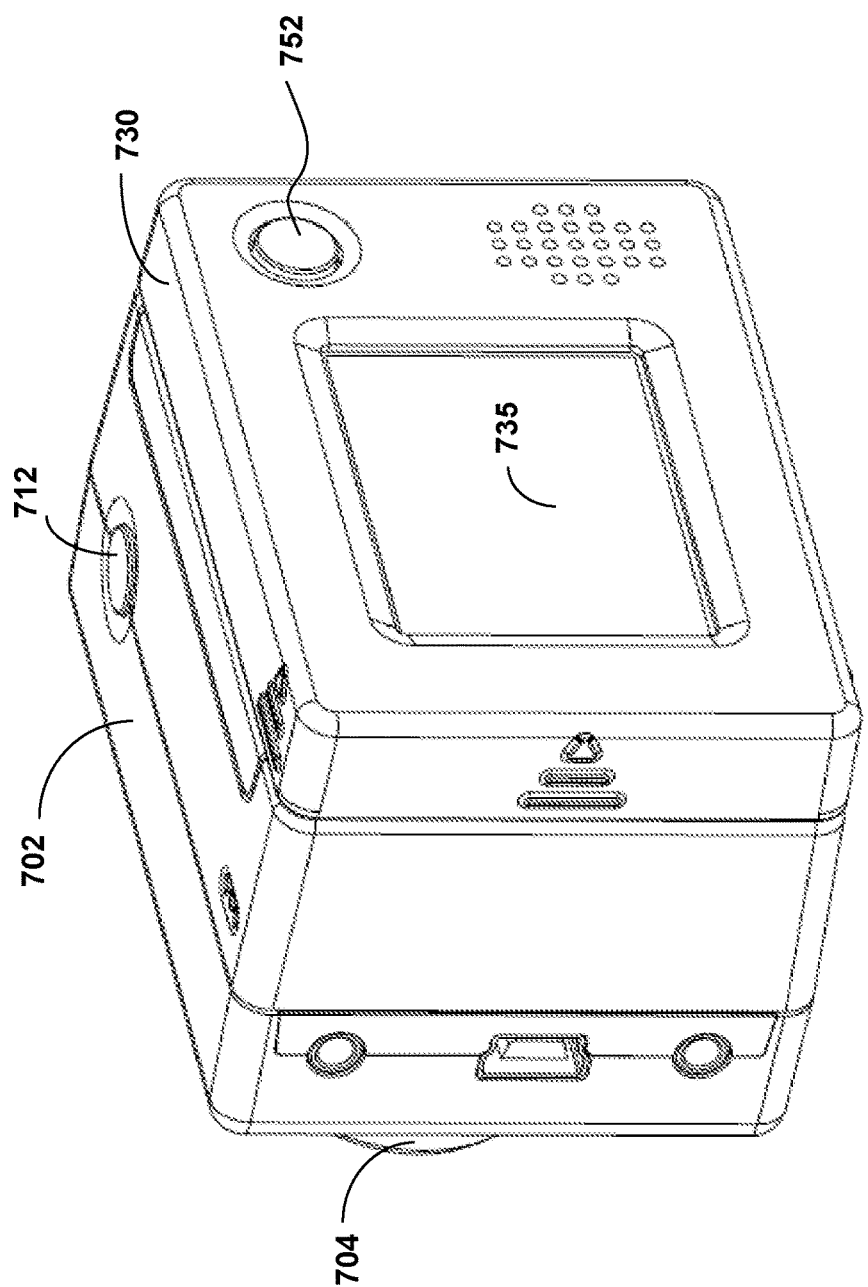
FIG. 9b illustrates a first view of an embodiment a camera with an expansion module attached to the camera body in an closed position.

FIGS. 9a-b illustrate various views of the expansion module 730 fully coupled to the camera body 702 (i.e. in a closed position). In this embodiment, the electrical connector 772 is securely connected to the electrical connection groove 774 to secure the expansion module 730 to the camera body 702 and to provide an electrical connection between the expansion module 730 and the camera body 702. The electrical connection allows for data flow between the camera body 702 and the expansion module 730 such as, for example, providing image data to the preview screen 735 of the expansion module 730. In various alternative embodiments, the electrical connection may provide for different types of data flow depending on the specific function of the expansion module 730.

It is note that some embodiments described herein have used the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An apparatus, comprising:
a first portion of a camera housing having an integrated camera battery;
a first portion of a first securing mechanism on a bottom edge of the first portion of the camera housing, the first portion of the first securing mechanism structured to removably couple to a second portion of the first securing mechanism on a bottom edge of a second portion of the camera housing, the second portion of the camera housing structured to form a cavity to receive a camera, the first securing mechanism structured to enable the first portion of the camera housing to rotate between an open position and a closed position with respect to the second portion of the camera housing;
a first portion of a second securing mechanism on a top edge of the first portion of the camera housing, the first portion of the second securing mechanism structured to removably couple to a second portion of the second securing mechanism structured on a top edge of the second portion of the camera housing, the second securing mechanism structured to enable the first portion of the camera housing to be securely latched to the second portion of the camera housing when in the closed position;
a sealing element around edges of a first surface of the first portion of the camera housing, the sealing element to form a watertight seal between the first and second portions of the camera housing when in the closed position; and
an interface protruding from the first surface of the first portion of the camera housing to couple the integrated camera battery to the camera and to provide power to the camera.

2. The apparatus of claim 1, wherein the first portion of the second securing mechanism comprises an L-shaped bar and wherein the second portion of the second securing mechanism comprises a hook-shaped lateral bar.

3. The apparatus of claim 1, wherein first securing mechanism comprises a hinging mechanism having an outer hinge structure including hook-shaped protrusions to fasten to a rod-shaped member of an inner hinge structure.

4. The apparatus of claim 1, wherein the first portion of the camera housing comprises a substantially rigid plastic.

5. The apparatus of claim 1, wherein the first portion of the camera housing has a substantially rectangular cross-section.

6. The apparatus of claim 1, wherein the first portion of the camera housing comprises a height in a range of approximately 4 to 6 centimeters and a width in a range of approximately 5 to 7 centimeters.

7. A housing door for a camera housing, comprising:
a door body having an integrated camera battery;
a first securing structure on a bottom edge of the door body, the first securing structure comprising a first portion of a rotatable hinge;
a second securing structure on a top edge of the door body, the second securing structure comprising a lateral bar;
a sealing element on a surface of the door body adjacent to the bottom edge, the top edge, a right edge, and a left edge of the door body; and
an interface protruding from the surface of the door body, the interface to provide power from the integrated camera battery.

8. The housing door of claim 7, wherein the lateral bar comprises an L-shaped lateral bar.

9. The housing door of claim 7, wherein the door body comprises a substantially rigid plastic.

10. The housing door of claim 7, wherein the door body has a substantially rectangular cross-section.

11. The housing door of claim 7, wherein the door body comprises a height in a range of approximately 4 to 6 centimeters and a width in a range of approximately 5 to 7 centimeters.

12. A camera system comprising:
   a first housing portion having a plurality of sides, a first portion of a first securing mechanism on a bottom edge of the first housing portion, and a first portion of a second securing mechanism on a top edge of the first housing portion;
   a camera positioned within a cavity between the plurality of sides of the first housing portion;
   a second housing portion having an integrated camera battery, the second housing portion comprising a second portion of the first securing mechanism on a bottom edge of the first housing portion, and a second portion of the second securing mechanism on a top edge of the second housing portion, the second housing portion comprising an interface coupling the integrated camera battery to a port of the camera such that the integrated camera battery provides power to the camera;
   wherein the first securing mechanism comprise a hinge configured to enable the first housing portion and the second housing portion to rotate with respect to each other about the hinge between an open position and a closed position;
   wherein the second securing mechanism comprises a latch configured to enable the first and second housing portions to be securely coupled together when in the closed position.

13. The camera system of claim 1, wherein the first portion of the second securing mechanism comprises an L-shaped bar and wherein the second portion of the second securing mechanism comprises a hook-shaped lateral bar.

14. The camera system of claim 1, wherein the hinge comprises an outer hinge structure including hook-shaped protrusions fastened to a rod-shaped member of an inner hinge structure.

15. The camera system of claim 1, wherein the first housing portion and the second housing portion comprise a substantially rigid plastic.

16. The camera system of claim 1, wherein the first housing portion and the second housing portion have a substantially rectangular cross-section.

17. The camera system of claim 1, wherein the first housing portion and the second housing portion each comprise a height in a range of approximately 4 to 6 centimeters and a width in a range of approximately 5 to 7 centimeters.

* * * * *